United States Patent
Fujita et al.

(10) Patent No.: US 9,876,716 B2
(45) Date of Patent: Jan. 23, 2018

(54) PACKET PROCESSING APPARATUS, FLOW ENTRY CONFIGURATION METHOD AND PROGRAM

(71) Applicant: NEC Corporation, Tokyo (JP)

(72) Inventors: Ken Fujita, Tokyo (JP); Yoji Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 90 days.

(21) Appl. No.: 14/651,641

(22) PCT Filed: Dec. 18, 2013

(86) PCT No.: PCT/JP2013/083857
§ 371 (c)(1),
(2) Date: Jun. 11, 2015

(87) PCT Pub. No.: WO2014/098114
PCT Pub. Date: Jun. 26, 2014

(65) Prior Publication Data
US 2015/0326477 A1 Nov. 12, 2015

(30) Foreign Application Priority Data

Dec. 19, 2012 (JP) ................. 2012-276734

(51) Int. Cl.
*H04L 12/741* (2013.01)
*H04W 72/10* (2009.01)
(Continued)

(52) U.S. Cl.
CPC ........ *H04L 45/745* (2013.01); *H04L 12/6418* (2013.01); *H04L 45/38* (2013.01);
(Continued)

(58) Field of Classification Search
None
See application file for complete search history.

(56) References Cited

U.S. PATENT DOCUMENTS 5,535,202 A * 7/1996 Kondoh ............ H04Q 11/0478
370/395.7
7,286,535 B2 * 10/2007 Ishikawa ................ H04L 47/10
370/351
(Continued)

FOREIGN PATENT DOCUMENTS

CN 102263664 A 11/2011
JP H 07-254906 A 10/1995
(Continued)

OTHER PUBLICATIONS

Extended European Search Report dated Jul. 7, 2016.
(Continued)

*Primary Examiner* — Ayaz Sheikh
*Assistant Examiner* — Faiyazkhan Ghafoerkhan
(74) *Attorney, Agent, or Firm* — McGinn IP Law Group, PLLC.

(57) ABSTRACT

A packet processing apparatus includes: a flow table in which flow entries can be stored in areas allocated in order of priority groups; an entry management unit that determines, upon receiving a new flow entry from a prescribed control apparatus, a storage position in the flow table based on which priority group among the plural priority groups the new flow entry belongs to, and on a level 2 priority that is used for determining position within the priority group; and an entry retrieval unit that scans from the beginning of the flow table, retrieves an entry having match condition(s) that match(es) a received packet, and determines processing to be applied to the received packet.

11 Claims, 11 Drawing Sheets

(51) Int. Cl.
*H04L 12/721* (2013.01)
*H04L 12/64* (2006.01)
*H04L 12/751* (2013.01)
*H04L 12/715* (2013.01)

(52) U.S. Cl.
CPC ............ *H04L 45/54* (2013.01); *H04W 72/10* (2013.01); *H04L 45/02* (2013.01); *H04L 45/64* (2013.01)

(56) References Cited

U.S. PATENT DOCUMENTS

| | | | | |
|---|---|---|---|---|
| 8,041,616 B2* | 10/2011 | Cullen | ................... | G06Q 10/06 705/26.4 |
| 8,677,030 B2* | 3/2014 | Srinivasan | ............... | G06F 13/28 370/389 |
| 2001/0028651 A1* | 10/2001 | Murase | ................... | H04L 45/00 370/392 |
| 2003/0037042 A1* | 2/2003 | Kametani | ......... | G06F 17/30952 |
| 2004/0151197 A1* | 8/2004 | Hui | ..................... | H04L 47/2416 370/412 |
| 2004/0202158 A1* | 10/2004 | Takeno | ................... | H04L 45/02 370/389 |
| 2004/0236720 A1* | 11/2004 | Basso | ............... | G06F 17/30985 |
| 2004/0255045 A1* | 12/2004 | Lim | ........................ | H04L 45/00 709/245 |
| 2005/0135399 A1* | 6/2005 | Baden | ................ | H04L 45/7453 370/428 |
| 2005/0281257 A1* | 12/2005 | Yazaki | ................... | H04L 45/00 370/389 |
| 2006/0010269 A1* | 1/2006 | Leibbrandt | ...... | G11B 20/00007 710/74 |
| 2006/0176721 A1* | 8/2006 | Kim | ....................... | G11C 15/00 365/49.16 |
| 2006/0253606 A1* | 11/2006 | Okuno | ................... | H04L 45/02 709/238 |
| 2008/0037546 A1* | 2/2008 | Ishikawa | ................. | H04L 47/10 370/392 |
| 2008/0270313 A1* | 10/2008 | Cullen | ................... | G06Q 10/06 705/80 |
| 2008/0320305 A1* | 12/2008 | Bruestle | ................. | H04L 12/44 713/168 |
| 2009/0249469 A1* | 10/2009 | Ishikawa | ................. | H04L 47/10 726/13 |
| 2010/0064072 A1* | 3/2010 | Tang | ....................... | G06F 13/28 710/39 |
| 2010/0082895 A1* | 4/2010 | Branscome | ............ | G11C 15/00 711/108 |
| 2011/0145255 A1* | 6/2011 | Kim | ................... | G06F 17/30327 707/741 |
| 2011/0267979 A1 | 11/2011 | Suzuki et al. | | |
| 2011/0289230 A1* | 11/2011 | Ueno | ...................... | H04L 45/42 709/228 |
| 2011/0310901 A1* | 12/2011 | Uchida | ................. | H04L 43/026 370/392 |
| 2013/0046882 A1* | 2/2013 | Takashima | .............. | H04L 45/38 709/224 |
| 2013/0163602 A1* | 6/2013 | Kang | ...................... | H04L 12/56 370/400 |
| 2013/0170495 A1* | 7/2013 | Suzuki | ................ | H04L 49/3009 370/392 |
| 2015/0312147 A1* | 10/2015 | Suzuki | ................ | H04L 49/3009 370/235 |

FOREIGN PATENT DOCUMENTS

| | | | | |
|---|---|---|---|---|
| JP | H 09-81099 A | 3/1997 | | |
| JP | WO 2011083786 A1 * | 7/2011 | ............. | H04L 45/38 |
| JP | WO 2012032864 A1 * | 3/2012 | ......... | H04L 49/3009 |
| RU | 2324986 C2 | 5/2008 | | |
| RU | 2429537 C2 | 9/2011 | | |
| WO | WO 2004/029957 A1 | 4/2004 | | |
| WO | WO 2011/083786 A1 | 7/2011 | | |
| WO | WO 2012/032864 A1 | 3/2012 | | |

OTHER PUBLICATIONS

Yannis Manolopoulos et al: "Advanced Database Indexing—chapter 2.1. External Sorting" In: "Advanced Database Indexing—chapter 2.1. External Sorting", Sep. 7, 2012, Springer Science & Business Media, XP055284624, ISBN: 978-1-4419-8590-3, p. 21.

International Search Report (ISR) (PCT Form PCT/ISA/210), in PCT/JP2013/083857, dated Mar. 11, 2014.

Nick McKeown and seven other authors, "OpenFlow: Enabling Innovation in Campus Networks", [online], [Search performed on Nov. 24, 2012], Internet <URL: http://www.openflow.org/documents/openflow-wp-latest.pdf>.

"Openflow Switch Specification" Version 1.3.1 Implemented (Wire Protocol 0x04), [online], [Search performed on Dec. 11, 2012], Internet <URL: https://www.opennetworking.org/images/stories/downloads/specification/openflow-spec-v1.3.1.pdf>.

Chinese Office Action dated Feb. 24, 2017 and English Translation thereof.

OpenFlow Switch Specification, Version 1.3.0 (Wire Protocol 0x04) Jun. 25, 2012, ONF TS-006.

Russian Office Action dated Nov. 3, 2016 with an English translation thereof.

* cited by examiner

FIG. 4

| # | PRIORITY GROUP | IN-GROUP PRIORITY | FLOW ENTRY CONTENT | ENTRY NUMBER |
|---|---|---|---|---|
| 1 | 8 | 2 | A | N-1 |
| 2 | 8 | 6 | B | N |
| 3 | 4 | 6 | C | X |
| 4 | 2 | 2 | D | 1 |
| 5 | 2 | 6 | E | 2 |
| : | | | | |

| FLOW TABLE |
|---|
| ENTRY 1 |
| ENTRY 2 |
| : |
| : |
| ENTRY (X-1) |
| ENTRY X |
| : |
| : |
| ENTRY (N-1) |
| ENTRY N |

211

222

| # | PRIORITY GROUP | IN-GROUP PRIORITY | FLOW ENTRY CONTENT | ENTRY NUMBER |
|---|---|---|---|---|
| 1 | 8 | 2 | A | N-1 |
| 2 | 8 | 6 | B | N |
| 3 | 4 | 6 | C | X |
| 4 | 2 | 2 | D | 1 |
| 5 | 2 | 6 | E | 2 |
| 6 | 4 | 2 | F | X-1 |
| : | | | | |

FIG. 9

| FLOW TABLE |
|---|
| ENTRY 1 |
| ENTRY 2 |
| .. |
| ENTRY (X-1) |
| ENTRY X |
| .. |
| ENTRY (N-1) |
| ENTRY N |

211

222

| # | PRIORITY GROUP | IN-GROUP PRIORITY | FLOW ENTRY CONTENT | ENTRY NUMBER |
|---|---|---|---|---|
| 1 | 8 | 2 | A | N-1 |
| 2 | 8 | 6 | B | N |
| 3 | 4 | 6 | C | X |
| 4 | 2 | 2 | D | 1 |
| 5 | 2 | 6 | E | 2 |
| 6 | 4 | 2 | F | X-1 |
| 7 | 2 | 4 | G | |
| .. | | | | |

FIG. 10

FLOW TABLE 211

| ENTRY 1 |
| ~~ENTRY 2~~ ENTRY 3 |
| ENTRY (X-1) |
| ENTRY X |
| ENTRY (N-1) |
| ENTRY N |

SHIFT

222

| # | PRIORITY GROUP | IN-GROUP PRIORITY | FLOW ENTRY CONTENT | ENTRY NUMBER |
|---|---|---|---|---|
| 1 | 8 | 2 | A | N-1 |
| 2 | 8 | 6 | B | N |
| 3 | 4 | 6 | C | X |
| 4 | 2 | 2 | D | 1 |
| 5 | 2 | 6 | E | 3 |
| 6 | 4 | 2 | F | X-1 |
| 7 | 2 | 4 | G | |
| .. | | | | |

PACKET PROCESSING APPARATUS, FLOW ENTRY CONFIGURATION METHOD AND PROGRAM

CROSS-REFERENCE TO RELATED APPLICATIONS

The present application claims priority from Japanese Patent Application No. 2012-276734 (filed on Dec. 19, 2012) the content of which is hereby incorporated in its entirety by reference into this specification. The present invention relates to a packet processing apparatus, a flow entry configuration method and a program, and in particular to a packet processing apparatus, a flow entry configuration method and a program, where a plurality of flow entries are held and packets processed.

TECHNICAL FIELD

Background

Non-Patent Literature 1 and 2 propose technology known as OpenFlow. In OpenFlow, communication is taken as end-to-end flow, and path control, failure recovery, load balancing, and optimization are performed on a per-flow basis. An OpenFlow switch as specified in Non-Patent Literature 2 is provided with a secure channel for communication with an OpenFlow controller, and operates according to a flow table in which addition or rewriting is instructed as appropriate by the OpenFlow controller. In the flow table, for each flow there are definitions of sets of match conditions (Match Fields) for collation with packet headers, flow statistical information (Counters), and instructions (Instructions) that define processing content (refer to "5.2 Flow Table" in Non Patent Literature 2).

For example, when an OpenFlow switch receives a packet, a search is made for an entry having a matching condition (refer to "5.3 Matching" in Non-Patent Literature 2) that matches header information of the received packet, from the flow table. As a result of the search, in a case where an entry matching the received packet is found, the OpenFlow switch updates the flow statistical information (Counters) and also implements processing content (packet transmission from a specified port, flooding, dropping, or the like) described in an Instructions field of the entry in question, for the received packet. On the other hand, as a result of the search, in a case where an entry matching the received packet is not found, the OpenFlow switch transmits a request for entry setting, to the OpenFlow controller via the secure channel, that is, a request to transmit control information for processing the received packet. The OpenFlow switch receives a flow entry determined by the processing content and updates the flow table. In this way, the OpenFlow switch performs packet forwarding using entries stored in the flow table as control information.

Patent Literature 1 discloses an information presentation apparatus that is provided with: an information storage means that collects information from a network, a priority determination means that determines priorities of the information, a degree of importance determination means that determines degree of importance in accordance with a user's interest with respect to the information, an interest information management means that manages information indicating a user's interest, a priority comparison means that determines output and storage of the information in accordance with priority, a sorting means that sorts the information in order of high degree of importance, a level of detail determination means that converts the information to a level of detail in accordance with degree of importance, a condensing means that generates condensed information, a history management means that arranges stored information, an information storage means that stores collected information, a priority monitoring means that records priorities of outputted information, and a presentation timing control means that controls timing of output of collected information to a terminal and collection of information from the network, wherein the apparatus presents information collected from the network with suitable timing and in a suitable amount.

Patent Literature 2 discloses a buffer control shift register (a shift register having a priority processing function) for transmitting ATM cells stored in an ATM switching apparatus, while performing management in accordance with deadlines of the cells.

PATENT LITERATURE (PTL)

[PTL 1]
Japanese Patent Kokai Publication No. JP09-81099A
[PTL 2]
Japanese Patent Kokai Publication No. JP07-254906A

NON PATENT LITERATURE (NPL)

[NPL 1]
Nick McKeown and seven other authors, "OpenFlow: Enabling Innovation in Campus Networks", [online], [Search performed on Nov. 24, 2012], Internet <URL: http://www.openflow.org/documents/openflow-wp-latest.pdf5.
[NPL 2]
"Openflow Switch Specification" Version 1.3.1 Implemented (Wire Protocol 0x04), [online], [Search performed on Dec. 11, 2012], Internet <URL: https://www.opennetworking.org/images/stories/downloads/specification/openflow-spec-v1.3.1.pdf>

SUMMARY

The following analysis is given according to the present invention. In an OpenFlow switch of Non-Patent Literature 1 or 2, it is known that flow entries are arranged and held in order of priority, and retrieval of flow entries is performed at high speed.

On receiving a new flow entry from an OpenFlow controller, an OpenFlow switch having functionality described above stores the new flow entry in a flow table as follows. First, the OpenFlow switch compares the priority of existing flow entries with the priority of the new flow entry. As a result of the comparison, the OpenFlow switch detects a flow entry on a low priority side and a flow entry on a high priority side, closest to the new flow entry. The OpenFlow switch then calculates locations where these 2 flow entries are recorded, and stores the new flow entry at an intermediate position therebetween.

At this time, there may be a case where the 2 flow entries are consecutively stored in the flow table, with no empty area at an intermediate position. In this case, the OpenFlow switch searches for an empty area closest to the storage position, and performs processing to shift storage positions of existing flow entries a prescribed number of entries. The shift amount at this time is determined, for example, in accordance with the size of the empty area of the shift target.

Thus, there is a problem in that, where the priorities of new flow entries are biased to a particular value, the frequency of sorting flow entries within the flow table increases. Further, there is a problem in that, according to the priority of a new flow entry, there is a large amount of sorting due to shifting of flow entries when 1 flow entry is recorded, so that the processing time for sorting increases, and the time required for recording the new flow entry increases.

It is an object of the present invention to provide a packet processing apparatus, a flow entry configuration method and a program, which can contribute to decreasing sorting cost when recording a new flow entry in the packet processing apparatus where flow entries are arranged and held in order of priority, as represented by an OpenFlow switch described above.

According to a first aspect there is provided: a packet processing apparatus having a flow table in which flow entries can be stored in areas allocated in order of priority groups; an entry management unit that determines, in a case of receiving a new flow entry from a prescribed control apparatus, a storage position in the flow table according to which priority group among the plural priority groups the new flow entry belongs to, and to level 2 priority that is used for determining a position within the priority group; and an entry retrieval unit that scans from the beginning of the flow table, retrieves an entry having a match condition that matches a received packet, and determines processing to be applied to the received packet.

According to a second aspect there is provided a flow entry configuration method in a packet processing apparatus including a flow table in which flow entries can be stored in areas allocated in order of priority group, and an entry retrieval unit that scans from the beginning of the flow table, retrieves an entry having a match condition that matches a received packet, and determines processing to be applied to the received packet, the method including: distinguishing, in a case of receiving a new flow entry from a prescribed control apparatus, a priority group to which the new flow entry belongs, based on priority information included in the new flow entry; distinguishing level 2 priority that is used for determining a position within the distinguished priority group, based on priority information included in said new flow entry; and storing the new flow entry in an area corresponding to the priority group and the level 2 priority, in the flow table. This method is associated with a particular mechanism known as a packet processing apparatus in which flow entries are arranged and held in order of priority.

According to a third aspect there is provided program that executes on a computer installed in a packet processing apparatus comprising a flow table in which flow entries can be stored in areas allocated in order of priority group, and an entry retrieval unit that scans from the beginning of the flow table, retrieves an entry having a match condition that matches a received packet, and determines processing to be applied to the received packet, the program executing: a process of distinguishing, in a case of receiving a new flow entry from a prescribed control apparatus, a priority group to which the new flow entry belongs, based on priority information included in the new flow entry; a process of distinguishing level 2 priority that is used for determining a position within the distinguished priority group, based on priority information included in said new flow entry; and a process of storing the new flow entry in an area corresponding to the priority group and the level 2 priority, in the flow table. It is to be noted that this program may be recorded on a computer-readable (non-transient) storage medium. That is, the present invention may be embodied as a computer program product.

The meritorious effects of the present invention are summarized as follows. According to the present invention, it is possible to reduce sorting cost when a new flow entry is recorded in a packet processing apparatus where flow entries are arranged and held in order of priority.

BRIEF DESCRIPTION OF DRAWINGS

FIG. 4 is a diagram showing an example of an entry management table held in an entry management unit of the packet processing apparatus in the first exemplary embodiment of the invention.

FIG. 7 is a diagram representing a change (shift unnecessary) of respective tables in a case of newly receiving a new flow entry F, in a state shown in FIG. 5.

FIG. 9 is a diagram representing a change (shift necessary) of respective tables in a case of newly receiving a new flow entry G, in a state shown in FIG. 7.

FIG. 10 is a continuity diagram of FIG. 9.

PREFERRED MODES

Figure 1:
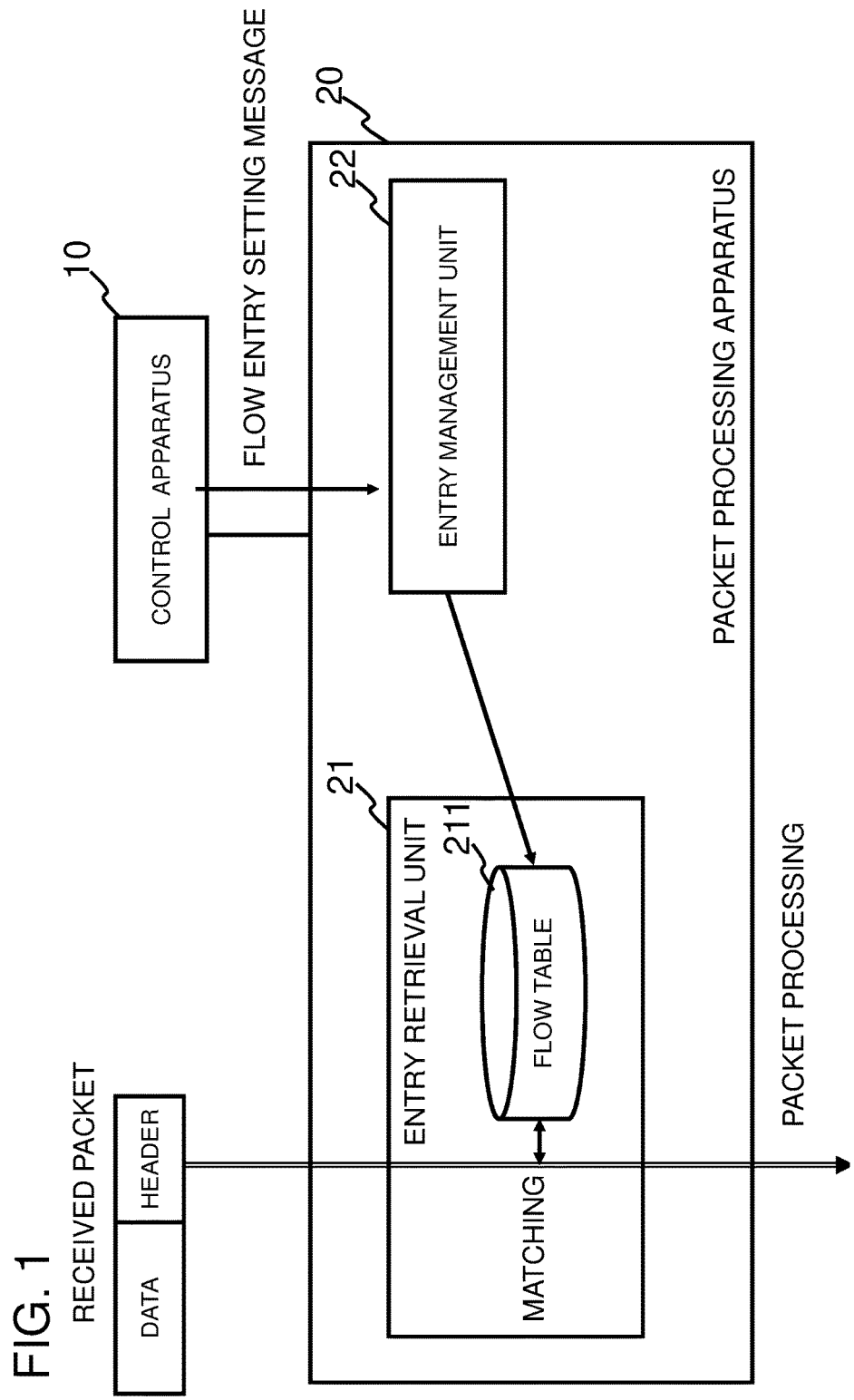
FIG. 1 is a diagram showing a configuration of a packet processing apparatus in a first exemplary embodiment of the present invention.

First, a description is given of an outline of exemplary embodiments of the present invention, making reference to the drawings. It is to be noted that reference symbols in the drawings attached to this outline are added to respective elements for convenience as examples in order to aid understanding, and are not intended to limit the present disclosure to modes illustrated in the drawings.

The present disclosure, in an exemplary embodiment thereof may be realized by a packet processing apparatus provided with an entry management unit (22 in FIG. 1), and an entry retrieval unit (21 in FIG. 1) that scans a flow table (211 in FIG. 1) from the beginning, retrieves an entry having a match condition that matches a received packet, and determines processing to be applied to the received packet.

More specifically, the flow table (211 in FIG. 1) is capable of storing flow entries in areas allocated in order of priority groups. In a case of receiving a new flow entry from a prescribed control apparatus (10 in FIG. 1), the entry management unit (22 in FIG. 1) determines a storage position in the flow table according to which priority group among the plural priority groups the new flow entry belongs to, and to level 2 priority that determines a position within the priority group.

As described above, in the flow table (211 in FIG. 1), since an area is allocated in the priority group order, if an empty area exists in a priority area to which the new flow entry belongs, sorting based on priority is unnecessary. Even where there is no empty area at the relevant position of the priority group to which the new flow entry belongs, it is possible to reduce sorting cost when the new flow entry is recorded, without performing processing to search for the closest empty area and shift a flow entry or entries.

First Exemplary Embodiment

FIG. 1 is a diagram showing a configuration of a packet processing apparatus in a first exemplary embodiment of the present disclosure. Referring to FIG. 1, a configuration is shown that includes a control apparatus 10 that transmits a flow entry setting message which instructs that a flow entry be set in the flow table 211, with respect to a packet processing apparatus 20; and the packet processing apparatus 20, which refers to the flow entry received from the control apparatus 10 to process packets received from another packet processing apparatus, terminal, server or the like.

The control apparatus 10 creates a flow entry to be set in the packet processing apparatus 20 in accordance with a request to set a flow entry from the packet processing apparatus 20 or a predetermined communication policy, and transmits a flow entry setting message to the packet processing apparatus 20. It is to be noted that with regard to a flow entry, associations of match conditions (Match Fields) for collation with packet headers, and instructions (Instructions) that define processing content, can be used. It is to be noted that with regard to this type of control apparatus 10, it is possible to use an OpenFlow controller of Non-Patent Literature 1 or 2.

The packet processing apparatus 20 is provided with an entry retrieval unit 21 that retrieves a flow entry having a match condition matching a received packet from the flow table 211, and an entry management unit 22 that manages flow entry configuration and the like in the flow table 211. With regard to this type of control apparatus 10, besides physical switches having functionality similar to the OpenFlow switches of Non-Patent Literature 1 or 2, a virtual switch that is operated on a virtual server, or a software switch that processes packets from a higher level application operating on a user terminal or the like, may be cited.

Figure 2:
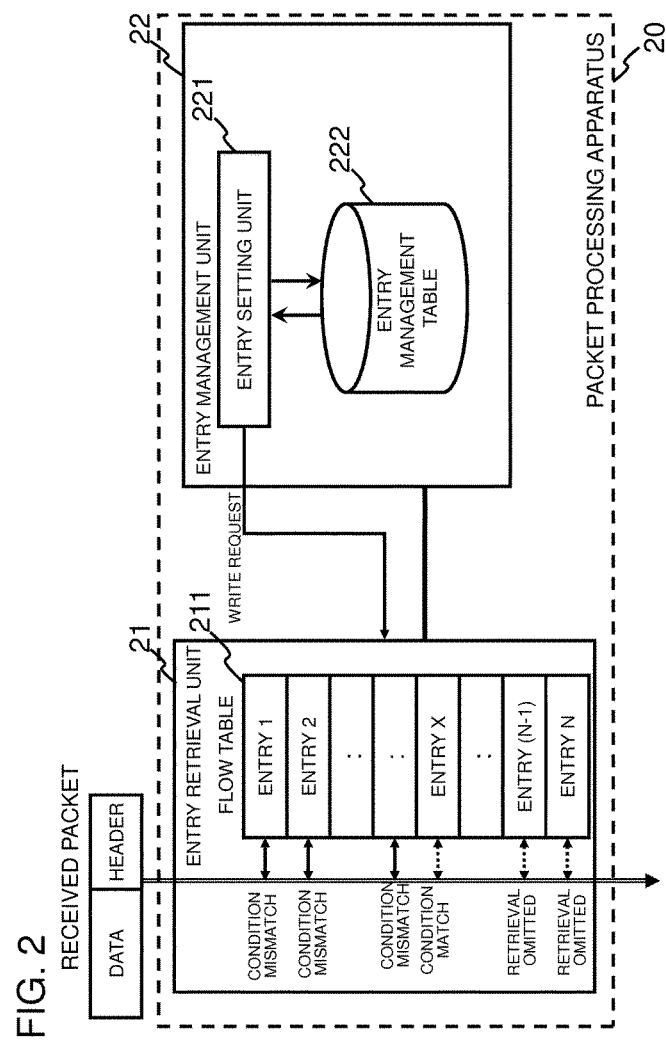
FIG. 2 is a diagram showing a detailed configuration of the packet processing apparatus in the first exemplary embodiment of the invention.

FIG. 2 is a diagram showing a detailed configuration of the abovementioned packet processing apparatus. In the example of FIG. 2, the flow table 211 is capable of storing N flow entries in order of higher priority. On receiving a packet from another packet processing apparatus, a terminal, a server or the like, the entry retrieval unit 21 proceeds to collate the header or the like of the received packet, in order, from entry 1, which has highest priority in the flow table 211, with flow entry match conditions. As a result of the collation, in a case where there is a match of a match condition and the received packet at entry X in FIG. 2, the entry retrieval unit 21 executes processing content (forwarding of the received packet, rewriting of the header, or the like) as described in the instructions (Instructions) of the flow entry that matches the match condition. Furthermore, where a flow entry matching the received packet as described above is found ("condition match" in FIG. 2), the entry retrieval unit 21 omits collating flow entries at entry X and below ("retrieval omitted" in FIG. 2).

Figure 3:
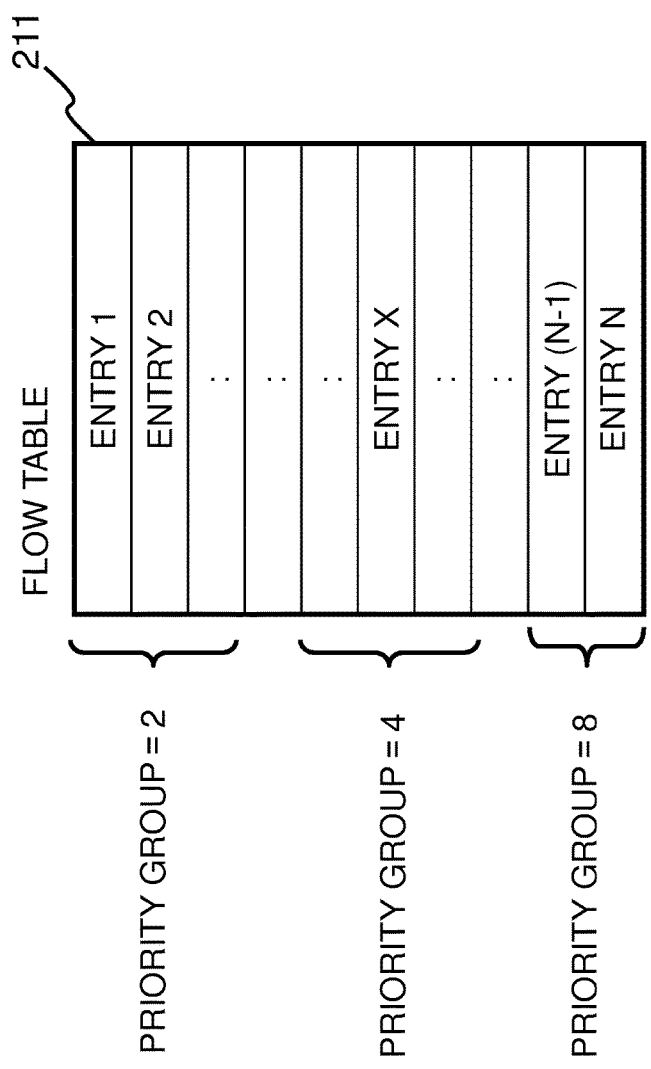
FIG. 3 is a diagram showing an example of a flow table held in an entry retrieval unit of the packet processing apparatus in the first exemplary embodiment of the invention.

FIG. 3 is a diagram showing an example of the flow table 211. In the flow table 211 of the present exemplary embodiment a plurality of areas are allocated in order of the priority groups, and flow entries can be stored in the order of the priority groups. In-group priority levels (level 2 priorities) for flow entries belonging to the same priority group are represented by storage positions within areas allocated to individual priority groups (in the case of the present exemplary embodiment, the higher the priority, the higher the storage position). For example, entry 1 and entry 2 in FIG. 3 both belong to a priority group=2 that has the highest priority among existing flow entries, and since entry 1 has a higher in-group priority (level 2 priority) than entry 2, the flow entries are set in order of entry 1, entry 2. Similarly, entry (N−1) and entry N in FIG. 3 both belong to a priority group=8 that has the lowest priority among existing flow entries, and since entry (N−1) has a higher in-group priority (level 2 priority) than entry N, flow entries are set in order of entry (N−1), entry N. It is to be noted that areas with the denotation ":" in FIG. 3 are empty areas.

The number of areas for flow entry storage allocated in each priority group in the flow table 211 may be determined in advance, or may be dynamically changed during operation. In this way, the number of empty entries in each priority group in the flow table 211 can be easily grasped.

The entry management unit 22 is provided with an entry management table 222 that manages content and position of flow entries set in the flow table 211, and an entry setting unit 221 that performs operations such as requests to write to the flow table 211 and the like, based on the entry management table 222.

FIG. 4 is a diagram showing an example of the entry management table 222. Referring to FIG. 4, with regard to each flow entry stored in the flow table 211, the diagram shows entries associating priority group, in-group priority (level 2 priority) and flow entry content, with entry number. For example, entry No. 1 in the entry management table 222 has content associating storage position (priority) of entry (N−1) of flow table 211 in FIG. 3 and flow entry content.

Figure 5:
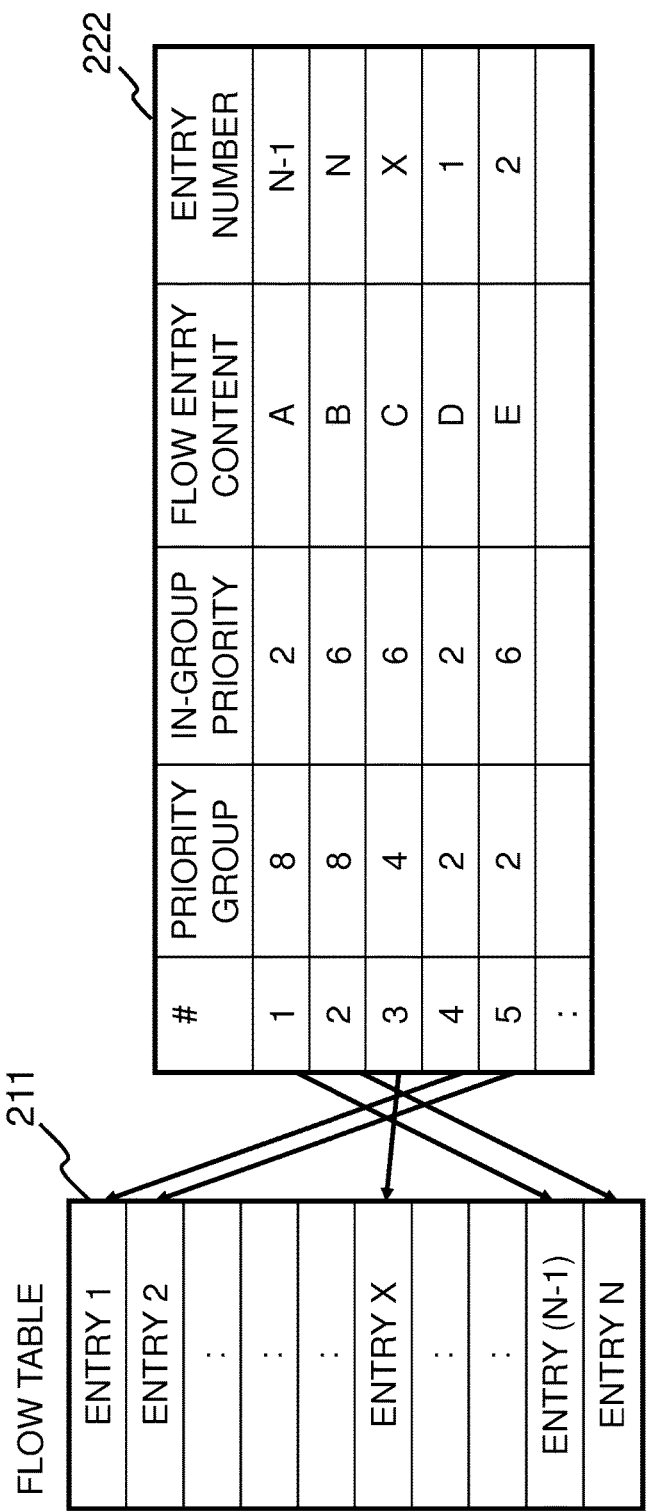
FIG. 5 is a diagram showing correspondence relationships between the entry management table of FIG. 3 and the flow table of FIG. 4.

FIG. 5 is a diagram showing correspondence relationships between the flow table 211 of FIG. 3 and the entry management table 222 of FIG. 4. On receiving a new flow entry setting message from the control apparatus 10, the entry setting unit 221 obtains the priority group and the in-group priority from the content thereof, makes a record thereof in the entry management table 222, and records the flow entry at a position identified by the priority group and in-group priority of the flow table 211. On receiving a flow entry deletion instruction message from the control apparatus 10, the entry setting unit 221 refers to the entry management table 222, and after deleting the relevant flow entry in the flow table 211, deletes the entry corresponding to the deleted flow entry in the entry management table 222.

It is to be noted that in a case of recording a new flow entry, for example, between entry 1 and entry 2, and between entry (N−1) and entry N in FIG. 3, there may be cases where a position identified according to priority group and in-group priority is not empty in the flow table 211. In this case, the entry setting unit 221 searches for the closest empty area and shifts a flow entry, to secure an area for storing the relevant new flow entry. For example, in a case of receiving a flow entry to be stored between entry 1 and entry 2 in FIG. 3 from the control apparatus 10, the entry setting unit 221 shifts entry 2 down one step, and stores the new flow entry in the position where entry 2 was stored heretofore.

It is to be noted that the entry retrieval unit 22 of the packet processing unit 20 shown in FIG. 1 and FIG. 2 may be implemented by a computer program that executes operational processing of the flow table 211, working together with the entry management table 222 described above, on a computer configuring the packet processing apparatus 20 using hardware thereof.

Figure 6:
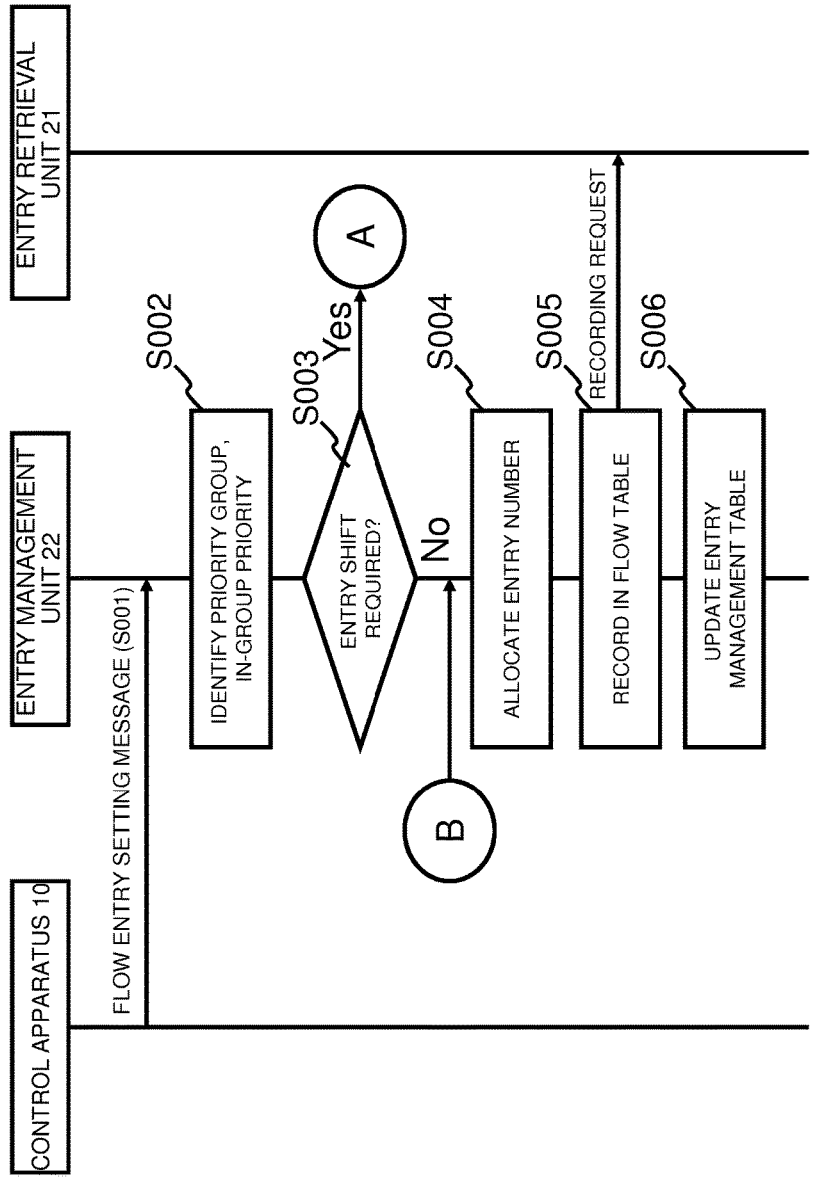
FIG. 6 is a sequence diagram representing operation of the first exemplary embodiment of the invention.

Next, a detailed description is given concerning operations of the present exemplary embodiment, making reference to the drawings. FIG. 6 is a sequence diagram representing operation of the first exemplary embodiment of the disclosure. The control apparatus 10 creates a flow entry to be set in the packet processing apparatus 20 in accordance with a request to set a flow entry from the packet processing apparatus 20 or a predetermined communication policy, and transmits a flow entry setting message to the packet processing apparatus 20 (step S001).

On receiving the new flow entry setting message, the packet processing apparatus 20 identifies the priority group to which the new flow entry belongs, and the in-group priority (level 2 priority) (step S002). With regard to a method of identifying the priority group and the in-group priority, various methods may be considered: for example, it is possible to use high order bit(s) of priority information designated in a new flow entry setting message from the control apparatus 10, in identifying the priority group, and to use lower order bit(s) in identifying in-group priority.

Next, the packet processing apparatus 20 confirms whether or not a position in the flow table 211 corresponding to the identified priority group and in-group priority is empty, that is, whether or not a shift operation of an existing entry is necessary (step S003).

As a result of the confirmation, in a case where the position in the flow table 211 corresponding to the identified priority group and in-group priority is empty, that is, in a case where a new flow entry can be stored without performing an operation of shifting an existing entry ("No" in step S003), the packet processing apparatus 20 records the new flow entry in the relevant position of the flow table 221 (steps S004, S005), and records the position (entry number) in the flow table 211 in the entry number column of the relevant entry of the entry management table 222 (step S006).

FIG. 7 is a diagram representing a change in respective tables in a case of newly receiving a new flow entry F having a group priority of "4" and an in-group priority of "2", with regard to a state shown in FIG. 5. The packet processing apparatus 20 confirms whether or not a position corresponding to a group priority of "4" and an in-group priority of "2" in the flow table 211 is empty. At the point in time of FIG. 5, since a position corresponding to the group priority of "4" and the in-group priority of "2" in the flow table 211 is empty, the packet processing apparatus 20 records the flow entry F in the (X−1)-th area from the top of the flow table 211. The packet processing apparatus 20 records (X−1) as the entry number of the flow entry F in the entry management table 222.

Figure 8:
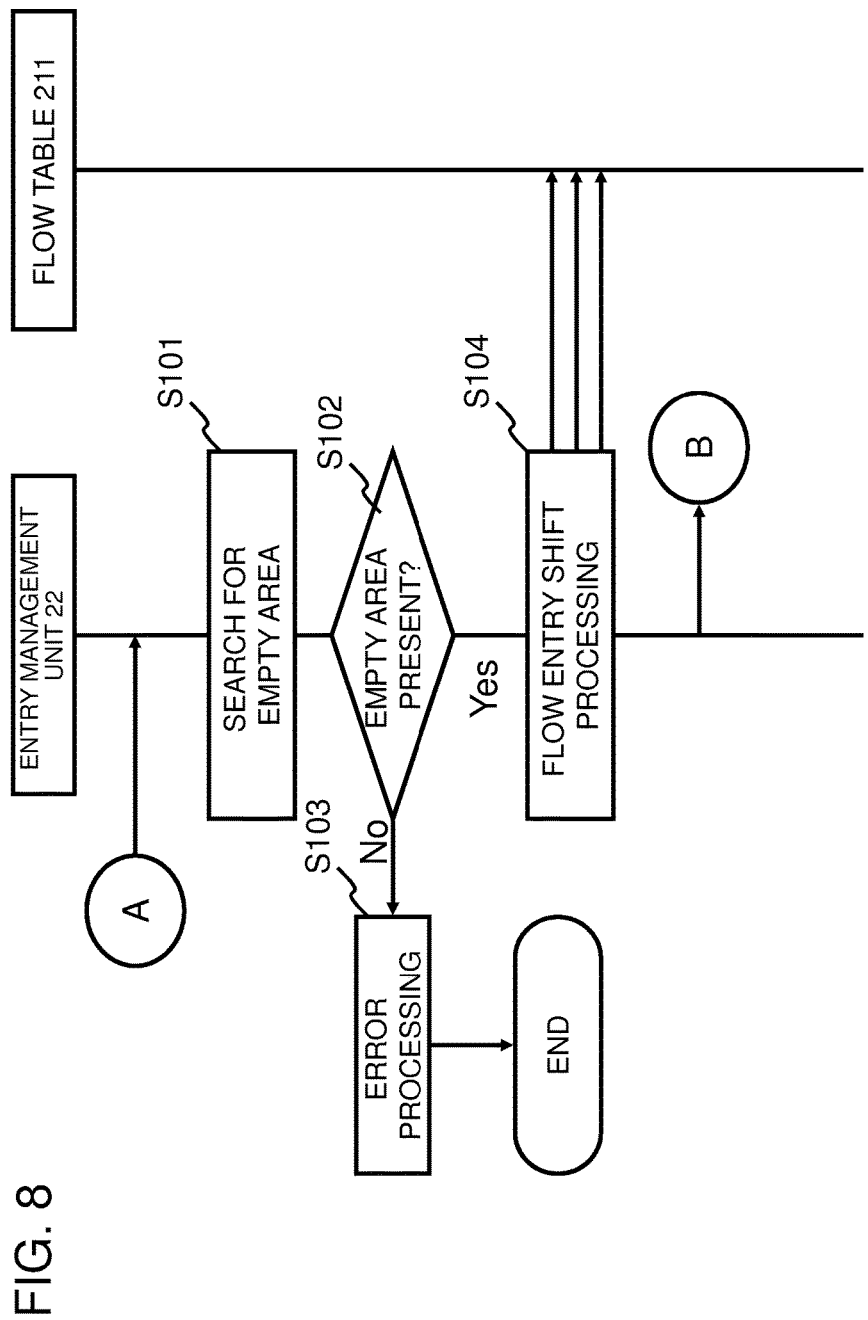
FIG. 8 is a sequence diagram representing operation in a case of judging that shift processing of an entry is necessary in step S003 of FIG. 6.

FIG. 8 is a sequence diagram representing operation in a case of judging, as a result of the confirmation in step S003 in FIG. 6, that there is no empty position in the flow table 211 corresponding to the identified priority group and in-group priority, that is, that a shift operation of an existing entry is necessary ("Yes" in step S003). In this case, the packet processing apparatus 20 searches for an empty area in the same priority group, closest to the relevant position of the flow table 211. As a result of the search, in a case where an empty area is not found in the same priority group, the packet processing apparatus 20 deletes the flow entry setting message, and returns an error to the control apparatus 10 (step S103). The control apparatus 10 receives the error response and considers deleting an unnecessary flow entry from the flow table 211.

On the other hand, as a result of the search, in a case where an empty area is found in the same priority group, the packet processing apparatus 20 creates an empty area by shifting a flow entry belonging to the same priority group in the direction of the empty area, with a position corresponding to the identified priority group and in-group priority as a start point (step S104). Thereafter, the packet processing apparatus 20 returns to step S004 and following, in FIG. 6, and executes recording of a new flow entry in the flow table 211, and updating of the entry management table 222.

FIG. 9 is a diagram representing a change in respective tables in a case of newly receiving a new flow entry G having a group priority of "2" and an in-group priority of "4", with regard to a state shown in FIG. 7. The packet processing apparatus 20 confirms whether or not there is an empty area at a position corresponding to the group priority of "2" and the in-group priority of "4" in the flow table 211. At the point in time of FIG. 7, since entry 1 (in-group priority "2") and entry 2 (in-group priority "6") belonging to group priority "2" are contiguously stored, there is no empty position corresponding to the group priority of "2" and the in-group priority of "4" in the flow table 211.

Accordingly, as shown in FIG. 10, the packet processing apparatus 20 detects that there is an empty area after entry 2 in the flow table 211, and executes shift processing to shift the storage position of entry 2 one step down. In conjunction with this, the packet processing apparatus 20 modifies the entry number of the entry that was entry number 2 heretofore in the entry management table 222, to "3". It is to be noted that the shift operation here may be only the new flow entry amount, that is, a shift of only 1, or may be a shift to make a plurality of areas empty, in anticipation of future usage.

Figure 11:
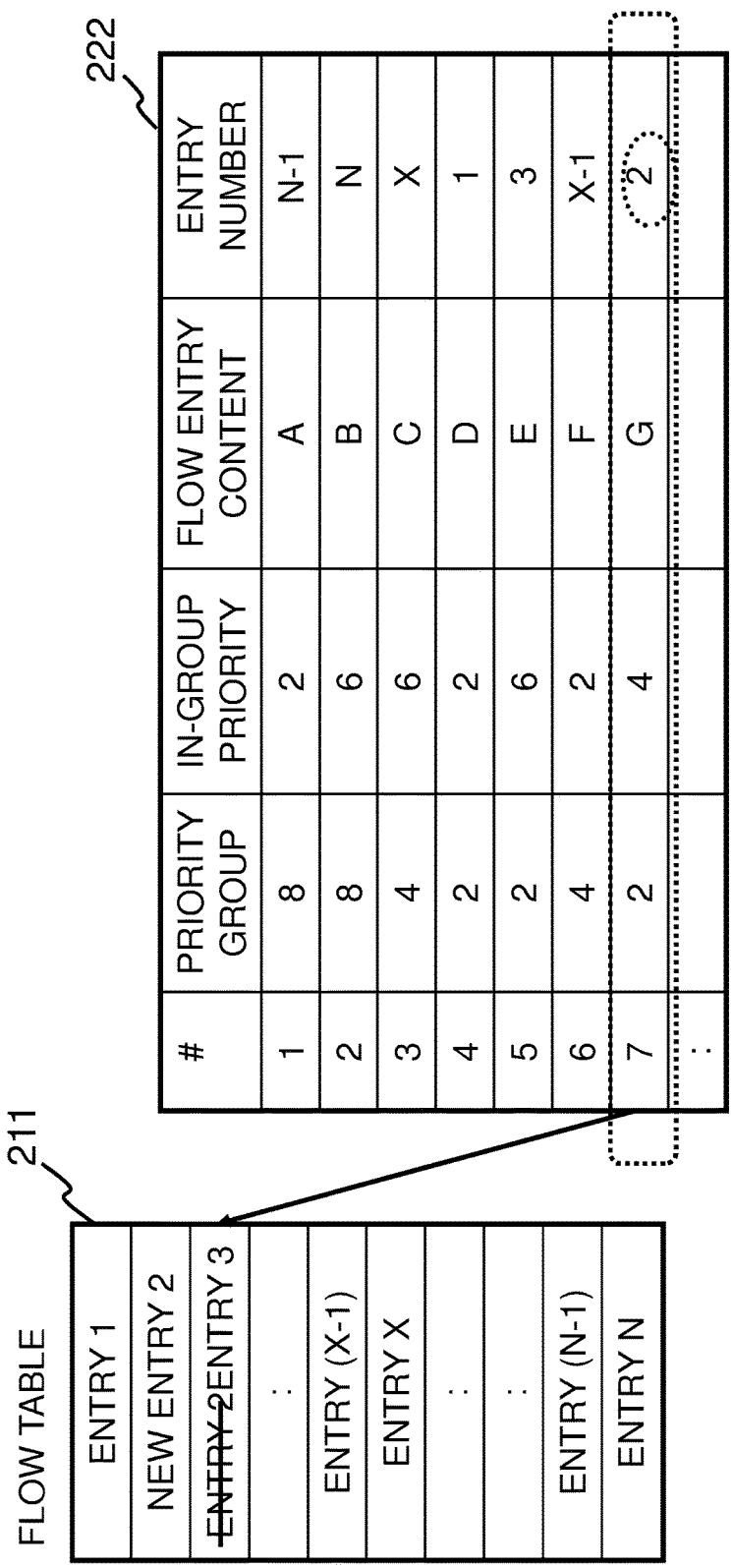
FIG. 11 is a continuity diagram of FIG. 10.

When an empty area can be secured by the shift processing, the packet processing apparatus 20, as shown in FIG. 11, records a new flow entry G (new entry 2) as entry number 2 in the flow table 211. The packet processing apparatus 20 records "2" in the entry number column of the new flow entry G in the entry management table 222.

As is clear from the above description, according to the present exemplary embodiment it is possible to realize both the speeding up of matching processing by arranging the flow entries in order of priority, and to reduce the cost of sorting when recording new flow entries.

A description has been given above of respective exemplary embodiments of the present disclosure, but the present disclosure is not limited to the abovementioned exemplary embodiments, and modifications, substitutions and adjustments may be added within a scope that does not depart from fundamental technical concepts of the disclosure. For example, network configuration and configuration of element(s) shown in the respective drawings are examples in order to aid understanding of the disclosure, and are not intended to limit the disclosure to configurations illustrated in the drawings.

For example, in the exemplary embodiment described above, descriptions were given in which lower level bit(s) of priority information specified in a new flow entry setting message from the control apparatus 10 is/are used as in-group priority or priorities, but it is also possible to use the arrival order of the flow entry setting messages from the control apparatus 10 as in-group priority (level 2 priority). By so doing, it is possible to further restrict the frequency of occurrence of shift processing of flow entries.

In the exemplary embodiments described above, a description was given where, when an empty area is not found in the same priority group storing a new flow entry, the packet processing apparatus 20 deletes the flow entry setting message and returns an error to the control apparatus 10, but a modified implementation may also be performed as follows.

(1) In a case where there is an empty area in another priority group of the flow table 211, the new flow entry is recorded in the relevant empty area. Along with this, the area in which the new flow entry is recorded is added to areas allocated to the relevant priority group of the flow table 211 (the area in which the new flow entry was recorded is deleted from the areas allocated to the other priority group where there is an empty area). In this case, where there is a plurality of priority groups with empty areas, it is possible to select a priority group with the lowest priority, or a priority group closest to the priority. It is to be noted that in this case, in order not to concentrate allocation of areas in a particular priority group, the allocation of an empty area can be returned to the original priority group at a time of deleting a flow entry of the relevant priority group.

(2) In a case where there is no empty area in all priority groups of the flow table 211, the flow entry selected by a prescribed reference is deleted and a report is made to the control apparatus 10. It is to be noted that with regard to the prescribed reference, a flow entry targeted for deletion may be selected according to a reference such as a low priority group and in-group priority, the least recently used, or the like.

(3) Several areas of the flow table 211 may be secured as shared areas not belonging to any priority group in an initial state. By so doing, it is possible to use the areas of the flow table 211 more efficiently.

Finally, preferred modes of the present invention are summarized.

First Mode (Refer to the packet processing apparatus according to the first aspect described above.)

Second Mode

The packet processing apparatus of the first mode, wherein in a case where there is no empty position determined according to the level 2 priority, with a position determined according to the level 2 priority as a start point, the entry management unit shifts a flow entry belonging to the same priority group as the new flow entry in a direction of the closest empty area of the same priority group, to store the new flow entry.

Third Mode

The packet processing apparatus of the first or second mode, wherein the entry management unit uses an entry management table holding management entries corresponding one-to-one with entries of the flow table, to manage the flow entries set in the flow table.

Fourth Mode

The packet processing apparatus of the first mode, wherein the order of receiving new flow entries from the prescribed control apparatus is used as the level 2 priority.

Fifth Mode

The packet processing apparatus of any of the first to fourth modes, wherein, on receiving a new flow entry, in a case where there is no empty area in a priority group to which the new flow entry belongs, in the flow table, the entry management unit stores the new flow entry in an empty area of a priority group lower than a priority group to which the new flow entry belongs.

Sixth Mode

The packet processing apparatus of the fifth mode, wherein, in a case where there is no empty area at an in-group position of a priority group to which the new flow entry belongs corresponding to the level 2 priority, as a priority group to store the new flow entry the new flow entry is stored in an empty area of a priority group with lowest priority among priority groups having empty areas.

Seventh Mode (Refer to the flow entry configuration method according to the second aspect described above.)

Eighth Mode (Refer to the program according to the third aspect described above.) It is to be noted that the seventh and eighth modes may be expanded to the second to sixth modes, as for the first mode.

It is to be noted that the various disclosures of the abovementioned Patent Literature and Non-Patent Literature are incorporated herein by reference thereto. Modifications and adjustments of exemplary embodiments and examples may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective exemplary embodiments and examples, respective elements of the respective drawings, and the like) are possible within the scope of the claims of the present invention. That is, the present invention clearly includes every type of transformation and modification that a person skilled in the art can realize according to the entire disclosure including the scope of the claims and to technological concepts thereof. In particular, with regard to numerical ranges described in the present specification, arbitrary numerical values or small ranges included in the relevant ranges should be interpreted to be specifically described even where there is no particular description thereof.

REFERENCE SIGNS LIST 10 control apparatus
20 packet processing apparatus
21 entry retrieval unit
22 entry management unit
211 flow table
221 entry setting unit
222 entry management table

The invention claimed is:
1. A packet processing apparatus, comprising:
a processor coupled to a memory storing instructions for executing:
a flow table in which flow entries can be stored in areas allocated in an order of a plurality of priority groups, said plurality of priority groups being classified only based on first level priorities assigned, respectively, to said plurality of priority groups;

an entry management unit that determines, in a case of receiving a new flow entry from a prescribed control apparatus, a storage position in said flow table according to which a priority group among said plurality of priority groups said new flow entry belongs to, and to a second level priority that is used for determining a position within said priority group; and an entry retrieval unit that scans from a beginning of said flow table, retrieves an entry having a match condition that matches a received packet, and determines processing to be applied to said received packet, wherein, on receiving said new flow entry, in a case where there is no empty area in said priority group to which said new flow entry belongs, in said flow table, said entry management unit stores said new flow entry in an empty area of a priority group lower than said priority group to which said new flow entry belongs.

2. The packet processing apparatus according to claim 1, wherein, in a case where there is no empty position determined according to said second level priority, with a position determined according to said second level priority as a start point, said entry management unit shifts a flow entry belonging to a same priority group as said new flow entry, in a direction of a closest empty area of the same priority group, to store said new flow entry.

3. The packet processing apparatus according to claim 2, wherein said entry management unit uses an entry management table holding management entries corresponding one-to-one with entries of said flow table, to manage said flow entries set in said flow table.

4. The packet processing apparatus according to claim 1, wherein said entry management unit uses an entry management table holding management entries corresponding one-to-one with entries of said flow table, to manage said flow entries set in said flow table.

5. The packet processing apparatus according to claim 1, wherein an order of receiving new flow entries from said prescribed control apparatus is used as said second level priority.

6. The packet processing apparatus according to claim 1, wherein, in a case where there is no empty area at an in-group position of said priority group to which said new flow entry belongs corresponding to said second level priority, as a priority group to store said new flow entry, said new flow entry is stored in an empty area of a priority group with lowest priority among priority groups having empty areas.

7. The packet processing apparatus according to claim 1, wherein there is no restriction other than the first level priorities on the flow entries that can be stored in each group of said plurality of priority groups.

8. A flow entry configuration method in a packet processing apparatus comprising a flow table in which flow entries can be stored in areas allocated in an order of a plurality of priority groups, said plurality of priority groups being classified only based on first level priorities assigned, respectively, to said plurality of priority groups, and an entry retrieval unit that scans from a beginning of said flow table, retrieves an entry having a match condition that matches a received packet, and determines processing to be applied to said received packet, said method comprising:

distinguishing, in a case of receiving a new flow entry from a prescribed control apparatus, a priority group to which said new flow entry belongs, based on priority information included in said new flow entry;

distinguishing second level priority that is used for determining a position within said priority group, based on the priority information included in said new flow entry; and storing said new flow entry in an area corresponding to said priority group and said second level priority, in said flow table, wherein, on receiving said new flow entry, in a case where there is no empty area in said priority group to which said new flow entry belongs, in said flow table, said new flow entry is stored in an empty area of a priority group lower than said priority group to which said new flow entry belongs.

9. The flow entry configuration method according to claim 8, wherein there is no restriction other than the first level priorities on the flow entries that can be stored in each group of said plurality of priority groups.

10. A non-transitory computer-readable recording medium storing thereon a program that executes on a computer installed in a packet processing apparatus comprising a flow table in which flow entries can be stored in areas allocated in an order of a plurality of priority groups, said plurality of priority groups being classified only based on first level priorities assigned, respectively, to said plurality of priority groups, and an entry retrieval unit that scans from a beginning of said flow table, retrieves an entry having a match condition that matches a received packet, and determines processing to be applied to said received packet, said program executing:

a process of distinguishing, in a case of receiving a new flow entry from a prescribed control apparatus, a priority group to which said new flow entry belongs, based on priority information included in said new flow entry;

a process of distinguishing second level priority that is used for determining a position within said priority group, based on priority the information included in said new flow entry; and a process of storing said new flow entry in an area corresponding to said priority group and said second level priority, in said flow table, wherein, on receiving said new flow entry, in a case where there is no empty area in said priority group to which said new flow entry belongs, in said flow table, said new flow entry is stored in an empty area of a priority group lower than said priority group to which said new flow entry belongs.

11. A packet processing apparatus, comprising:

a processor coupled to a memory storing instructions for executing:

a flow table in which flow entries can be stored in areas allocated in an order of a plurality of priority groups, said plurality of priority groups being classified only based on first level priorities assigned, respectively, to said plurality of priority groups;

an entry management unit that determines, in a case of receiving a new flow entry from a prescribed control apparatus, a storage position in said flow table according to which a priority group among said plurality of priority groups said new flow entry belongs to, and to a second level priority that is used for determining a position within said priority group; and an entry retrieval unit that scans from a beginning of said flow table, retrieves an entry having a match condition that matches a received packet, and determines processing to be applied to said received packet, wherein, on receiving a new flow entry, said entry management unit stores said new flow entry in an empty area of a priority group lower than said priority group to which said new flow entry belongs.

* * * * *